(12) United States Patent
Colgate et al.

(10) Patent No.: US 11,041,730 B2
(45) Date of Patent: Jun. 22, 2021

(54) REVERSE RENDERING OF AN IMAGE BASED ON HIGH DEFINITION MAP DATA

(71) Applicant: DeepMap Inc., Palo Alto, CA (US)

(72) Inventors: Gil Colgate, Foster City, CA (US); Mark Damon Wheeler, Saratoga, CA (US)

(73) Assignee: DEEPMAP INC., Palo Alto, CA (US)

( * ) Notice: Subject to any disclaimer, the term of this patent is extended or adjusted under 35 U.S.C. 154(b) by 186 days.

(21) Appl. No.: 16/290,489

(22) Filed: Mar. 1, 2019

(65) Prior Publication Data

US 2019/0271548 A1    Sep. 5, 2019

Related U.S. Application Data

(60) Provisional application No. 62/637,993, filed on Mar. 2, 2018.

(51) Int. Cl.
*G01C 21/32* (2006.01)
*G01C 21/34* (2006.01)
(Continued)

(52) U.S. Cl.
CPC ......... *G01C 21/32* (2013.01); *G01C 21/3415* (2013.01); *G01C 21/3602* (2013.01); *G01C 21/367* (2013.01); *G01C 21/3638* (2013.01); *G01C 21/3667* (2013.01); *G05D 1/0088* (2013.01); *G06K 9/00711* (2013.01); *G06K 9/00791* (2013.01); *G06K 9/726* (2013.01); *G06T 7/70* (2017.01); *G06T 11/60* (2013.01);
(Continued)

(58) Field of Classification Search
CPC .......... G01C 21/32; G01C 21/3692; G01C 21/3667; G01C 21/3415; G01C 21/367; G01C 21/3638; G01C 21/28; G05D 1/0088; G05D 1/0231; G05D 2201/0213; G05D 1/027; G06K 9/00711; G06K 9/00791; G06K 9/726; G06T 7/70; G06T 11/60; G06T 2207/10004; G06T 2207/10028; G06T 2207/20221; G06T 2207/30252; G06T 11/00
See application file for complete search history.

(56) References Cited

U.S. PATENT DOCUMENTS 9,221,396 B1 * 12/2015 Zhu ........................... G01S 7/40
10,635,844 B1 * 4/2020 Roose ....................... G06T 7/75
(Continued)

*Primary Examiner* — Dale W Hilgendorf
*Assistant Examiner* — Alexander C. Bost
(74) *Attorney, Agent, or Firm* — Maschoff Brennan

(57) ABSTRACT

The autonomous vehicle generates an overlapped image by overlaying HD map data over sensor data and rendering the overlaid images. The visualization process is repeated as the vehicle drives along the route. The visualization may be displayed on a screen within the vehicle or at a remote device. The system performs reverse rendering of a scene based on map data from a selected point. For each line of sight originating at the selected point, the system identifies the farthest object in the map data. Accordingly, the system eliminates objects obstructing the view of the farthest objects in the HD map as viewed from the selected point. The system further allows filtering of objects using filtering criteria based on semantic labels. The system generates a view from the selected point such that 3D objects matching the filtering criteria are eliminated from the view.

25 Claims, 21 Drawing Sheets

(51) Int. Cl.
- *G01C 21/36* (2006.01)
- *G05D 1/00* (2006.01)
- *G06K 9/00* (2006.01)
- *G06K 9/72* (2006.01)
- *G06T 7/70* (2017.01)
- *G06T 11/60* (2006.01)
- *G05D 1/02* (2020.01)

(52) U.S. Cl.
CPC ........... *G05D 1/027* (2013.01); *G05D 1/0231* (2013.01); *G05D 2201/0213* (2013.01); *G06T 2207/10004* (2013.01); *G06T 2207/10028* (2013.01); *G06T 2207/20221* (2013.01); *G06T 2207/30252* (2013.01)

(56) References Cited

U.S. PATENT DOCUMENTS

| | | | |
|---|---|---|---|
| 2014/0368493 A1* | 12/2014 | Rogan | G06K 9/00201 345/419 |
| 2017/0098323 A1* | 4/2017 | Rogan | G01S 7/4802 |
| 2017/0243352 A1* | 8/2017 | Kutliroff | G06T 19/006 |
| 2018/0314921 A1* | 11/2018 | Mercep | G01S 13/87 |
| 2019/0050648 A1* | 2/2019 | Stojanovic | G06T 11/60 |
| 2019/0114921 A1* | 4/2019 | Cazzoli | H04W 4/40 |
| 2019/0145765 A1* | 5/2019 | Luo | G06K 9/00791 702/153 |
| 2019/0179027 A1* | 6/2019 | England | G01S 7/4808 |
| 2019/0197323 A1* | 6/2019 | Sakai | B60W 50/14 |
| 2019/0197778 A1* | 6/2019 | Sachdeva | G06T 17/05 |
| 2019/0236380 A1* | 8/2019 | Fukuhara | G05D 1/0251 |
| 2019/0244515 A1* | 8/2019 | Hacker | G08G 1/167 |
| 2019/0339701 A1* | 11/2019 | Pedersen | G05D 1/0044 |
| 2020/0098135 A1* | 3/2020 | Ganjineh | G06T 7/74 |
| 2020/0262349 A1* | 8/2020 | Oniwa | B60R 1/00 |
| 2020/0269877 A1* | 8/2020 | Mortazavi | G01S 19/42 |

* cited by examiner

REVERSE RENDERING OF AN IMAGE BASED ON HIGH DEFINITION MAP DATA

CROSS-REFERENCE TO RELATED APPLICATION

This application claims the benefit of U.S. Provisional Application No. 62/637,993, filed Mar. 2, 2018, which is hereby incorporated by reference in its entirety.

BACKGROUND

This disclosure relates generally to high definition maps for autonomous vehicles, and, more particularly, to visualization of high definition map data, for example, visualization of high definition map data in combination with sensor data captured by autonomous vehicles.

Autonomous vehicles, also known as self-driving cars, driverless cars, auto cars, or robotic cars, drive from a source location to a destination location without requiring a human driver to control and navigate the vehicle. Automation of driving is difficult for several reasons. For example, autonomous vehicles use sensors to make driving decisions on the fly, but vehicle sensors cannot observe everything all the time. Vehicle sensors can be obscured by corners, hills, other vehicles, and other obstructions. Vehicles sensors may not observe certain things early enough to make decisions. In addition, lanes and signs may be missing on the road or knocked over or hidden by bushes, and therefore not detectable by sensors. Furthermore, road signs for rights of way, used to determine the direction of traffic, may not be readily visible.

Autonomous vehicles can use map data to discern some of the above information instead of relying on sensor data. However, conventional maps have several drawbacks that make them difficult for use by an autonomous vehicle. For example, maps do not provide the level of accuracy required for safe navigation (e.g., 10 cm or less). GPS systems provide accuracies of approximately 3-5 meters but have large error conditions resulting in an accuracy of over 100 m. This makes it challenging to accurately determine the location of a vehicle. Autonomous vehicles need to use high definition maps with very high level of accuracy to be able to navigate along a route. Furthermore, autonomous vehicles need to perform localization to determine their location in the high definition map. Accurate localization is important for an autonomous vehicle to be able to navigate. For example, an error in the current location of the vehicle may result in erroneous decisions by the computing systems of the autonomous vehicles causing the autonomous vehicle to drive incorrectly, possibly causing accidents. If users do not have high confidence in the accuracy of the high definition map data as well as accuracy of the localization of the autonomous vehicle, users are less likely to rely on an autonomous vehicle.

SUMMARY

A system generates map data comprising 3D grid representation of the world. The system renders an image of a scene based on the map data from a reference point. For each line of sight originating at the selected point, the system identifies the farthest object in the map data. The system renders points of the identified object and excludes points of objects that lie between the reference point and the farthest object. As a result, the system eliminates objects obstructing the view of the farthest objects as viewed from the reference point.

According to an embodiment, the system performs reverse rendering by executing these steps. A system of a vehicle receives sensor data comprising information about a route of a vehicle. Examples of sensor data include camera images and lidar scans. The system performs localization based on the sensor data to determine a location of the vehicle. The system accesses map data corresponding to a region surrounding the determined location of the vehicle. The system identifies a reference point, for example, a point that is at a threshold height above the location of the vehicle. The system selects points on objects encountered within each line of sight originating from the reference point. For each angle in a plurality of angles originating at the reference point, the system selects a point on an object from the map data that is farthest from the reference point along the line. If there are one or more objects that lie between the farthest object and the reference point along the line, the system excludes these objects. The system generates an image displaying the selected points. Accordingly, the generated image includes objects that may be obstructed by other objects while excluding the objects that cause the obstruction. The system transmits the generated image for display on a client device.

In an embodiment, the system moves the reference point as the vehicle moves. For example, the reference point may be adjusted to be the point that is at a threshold height above the vehicle as the vehicle moves. The above steps may be repeated as a vehicle drives along a route to dynamically update the generated image. As a result, the system generates a video showing the scene as observed from the reference point as the vehicle moves. The system may transmit the generated video to a remote display device for displaying the video.

In some embodiments, the steps of the above process are executed for a plurality of locations to generate pre-rendered images that may be loaded and displayed when a vehicle passes through a region.

In an embodiment, the system transmits the generated image to a remote display device for displaying a video. The video shows the scene as observed from the point of view of the autonomous vehicle as the autonomous vehicle moves.

In an embodiment, the system renders a second image of an object that does not exist in the map data and overlays the second image on the generated image. The second image may comprise information describing the route of the autonomous vehicle, the information comprising signs, markings, messages, or any combination thereof.

BRIEF DESCRIPTION OF THE DRAWINGS

Figure (FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time-consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region.

The HD map system generates and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

System Environment

Figure 1:
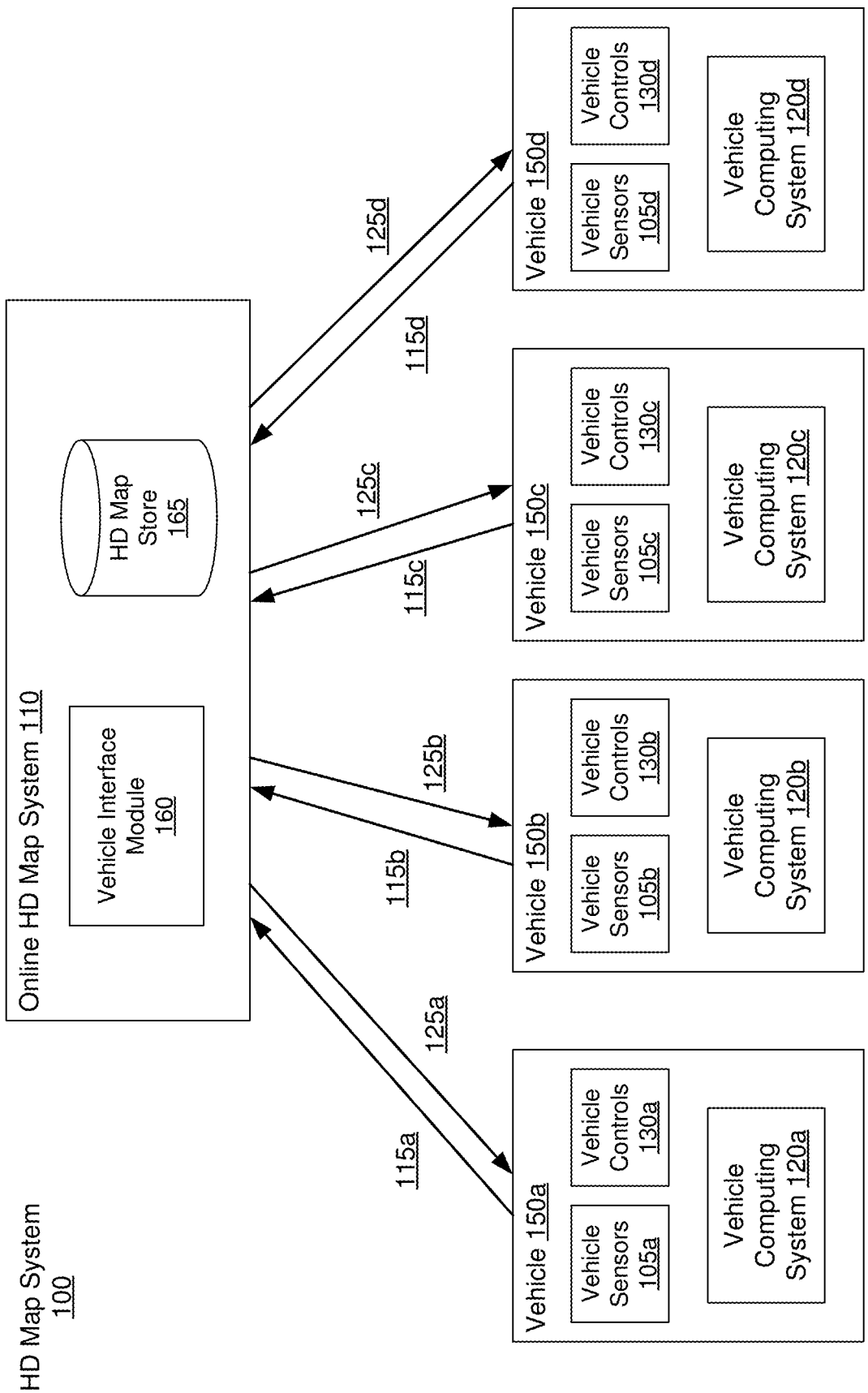

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
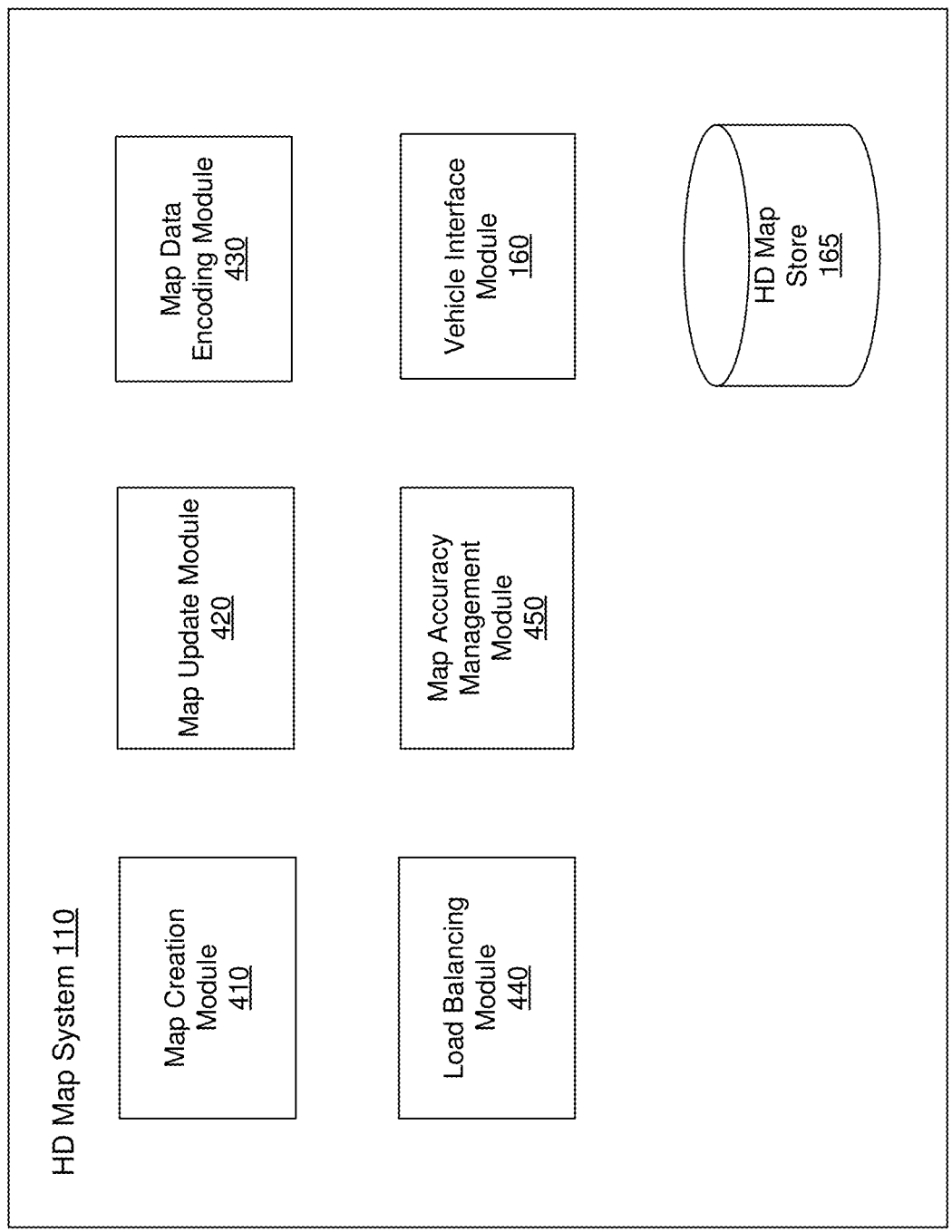
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR, also referred to as lidar, surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Vehicle Computing System

Figure 2:
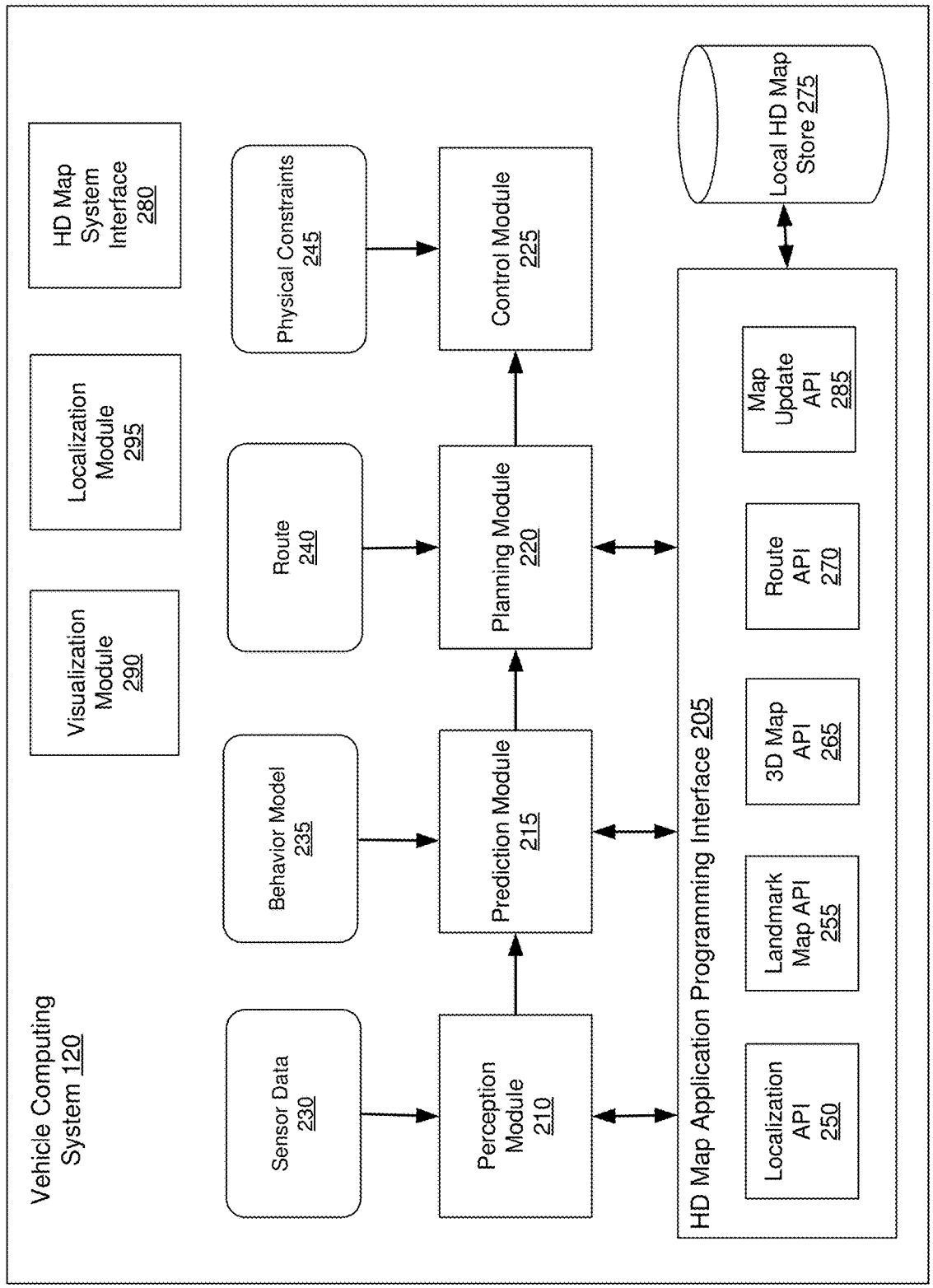
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, lidar, IMU, GPS navigation system, and so on. The sensor data 230 may include RGB images, lidar scan point clouds, radar images, GPS data, and data describing vehicle motion as captured by IMU. The RGB images represent images or video streams comprising video frames captured from cameras mounted on the vehicle. The lidar scan represent point clouds gathered from various lidars mounted on the vehicle 150. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 265 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

FIG. 4 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
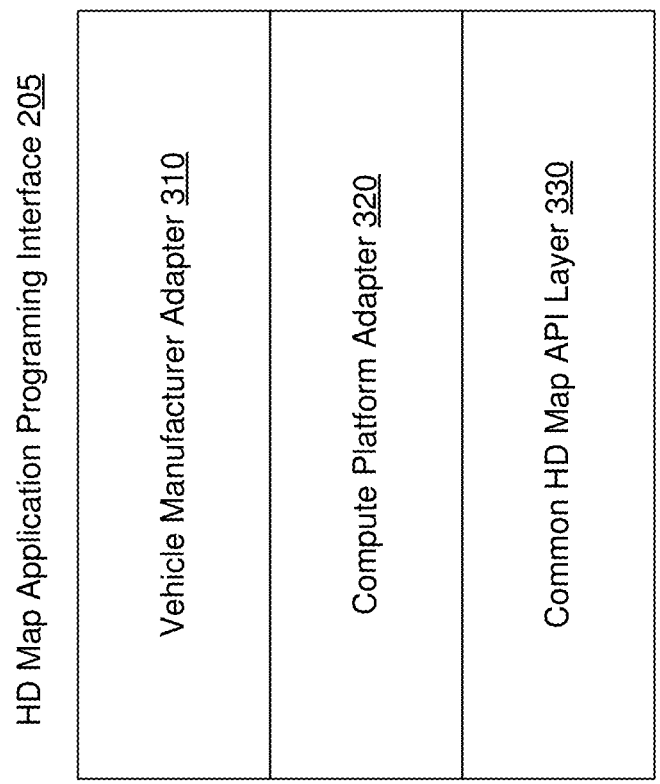
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a computer platform adapter 320, and a common HD map API layer 330. The common HD map API layer comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of computer platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module, a vehicle interface module, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
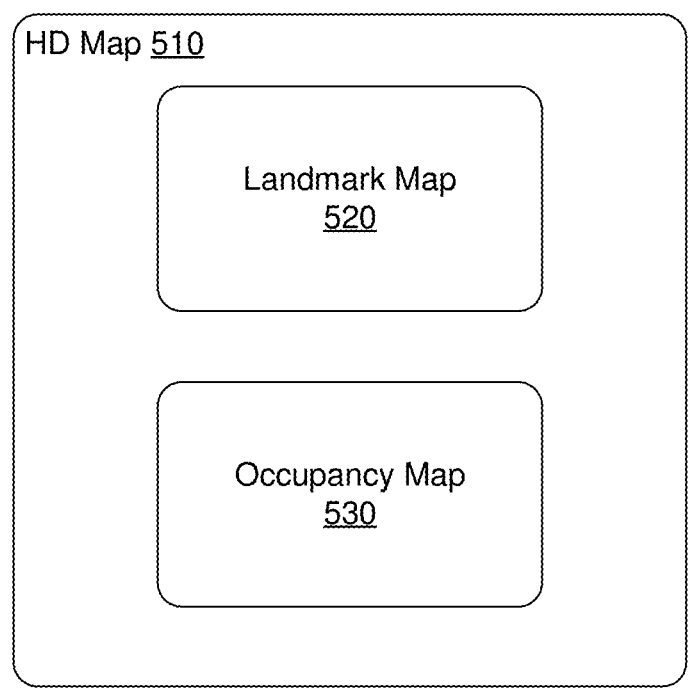
FIG. 5 illustrates the components of an HD map, according to an embodiment.

FIG. 5 illustrates the components of an HD map, according to an embodiment. The HD map 510 comprises maps of several geographical regions. The HD map 510 of a geographical region comprises a landmark map (LMap) 520 and an occupancy map (OMap) 530. The landmark map 520 comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map 520 may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map 510 include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4\times10^{15}$ bytes or 4 petabytes. Therefore, the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD map 510 does not require or rely on data typically included in maps, such as addresses, road names, ability to geo-code an address, and ability to compute routes between place names or addresses. The vehicle computing system 120 or the online HD map system 110 accesses other map systems, for example, any vendor that provides mapping services to obtain this information. Accordingly, a vehicle computing system 120 or the online HD map system 110 receives navigation instructions from a tool such as a mapping service into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
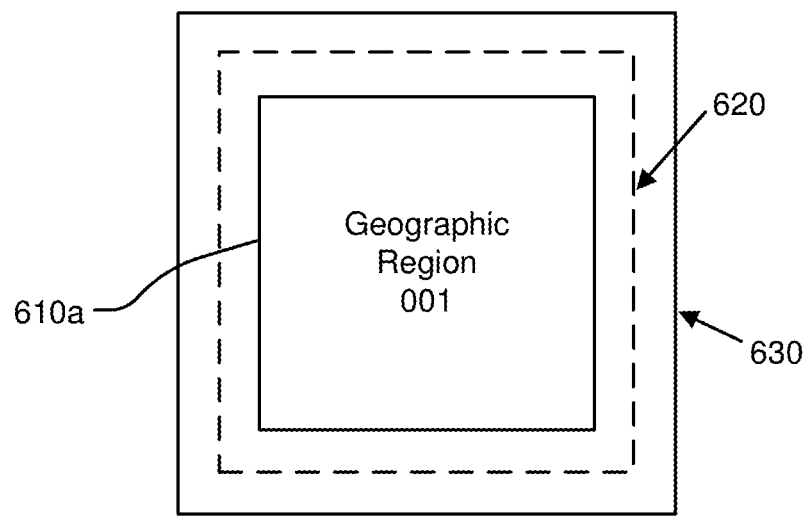
FIGS. 6A-B illustrate geographical regions defined in an HD map, according to an embodiment.
Figure 6B:
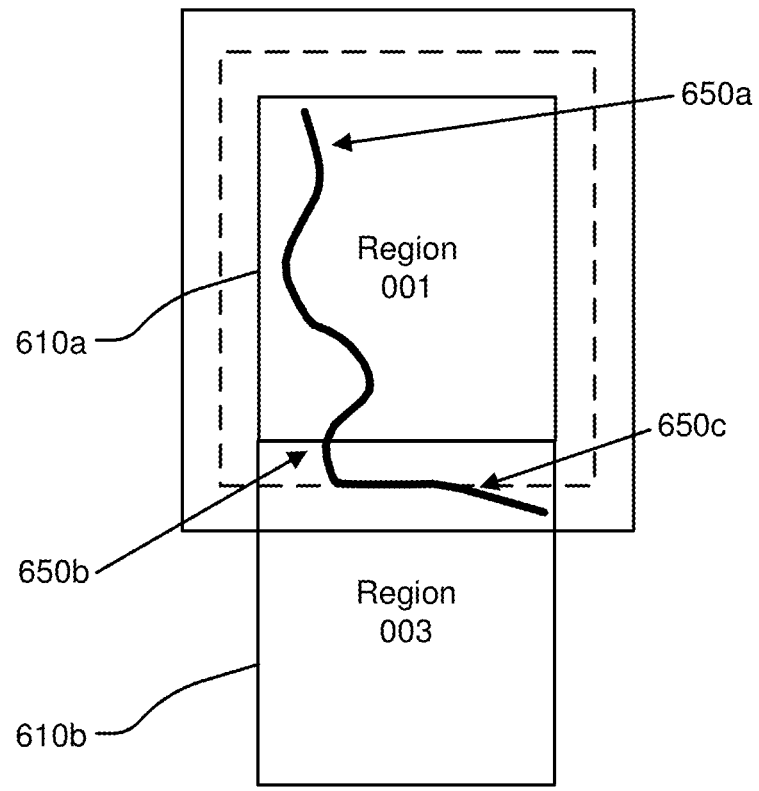

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it crosses the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
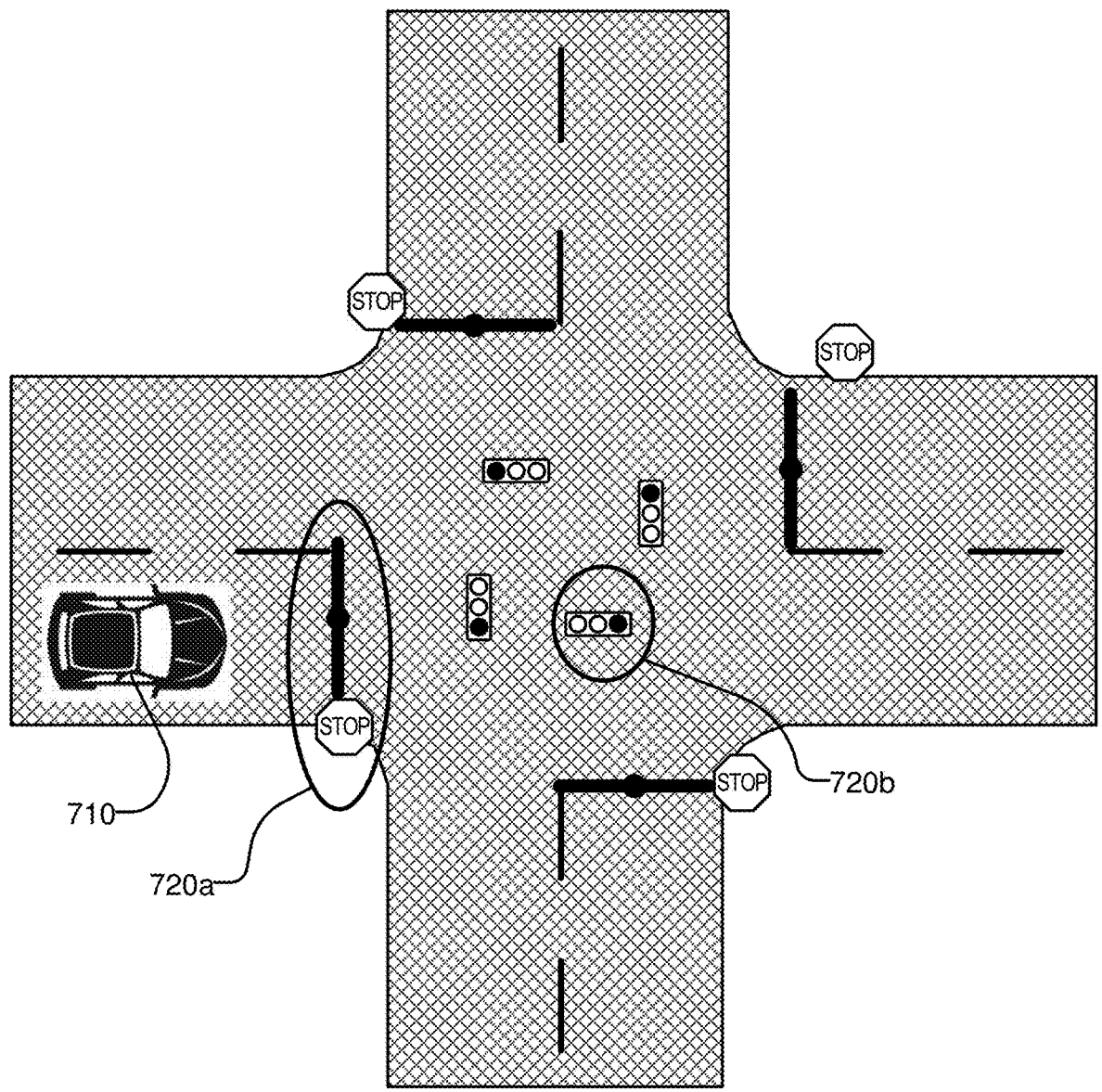
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system 100 provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
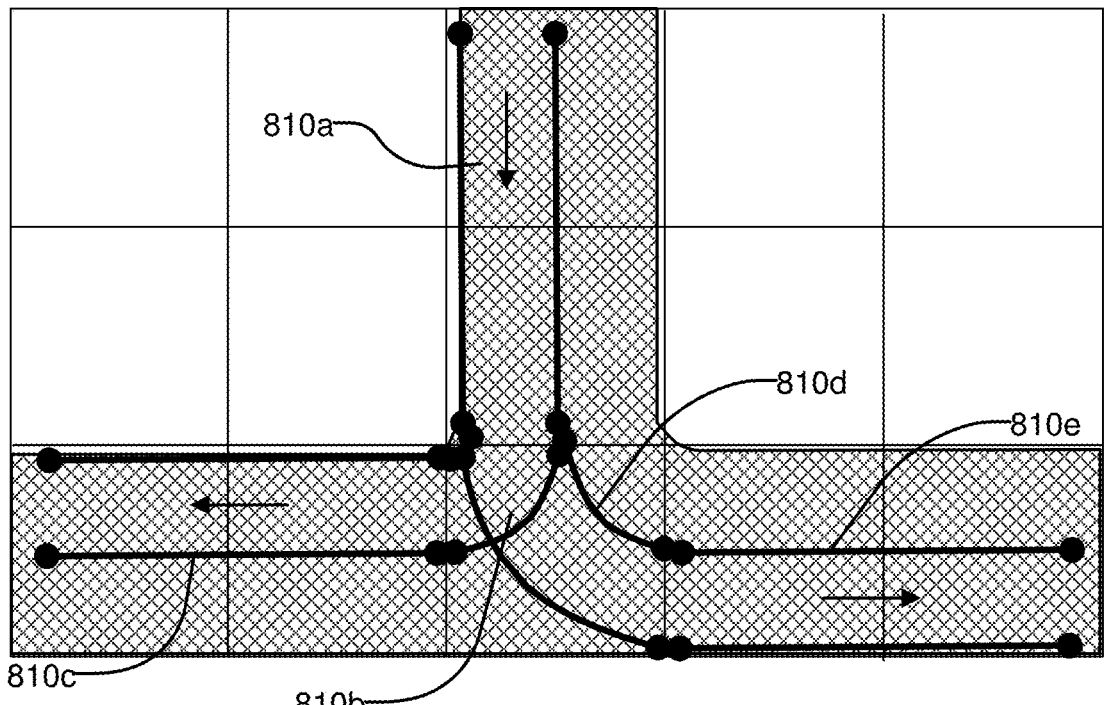
FIGS. 8A-B illustrates lane elements and relations between lane elements in an HD map, according to an embodiment.
Figure 8B:
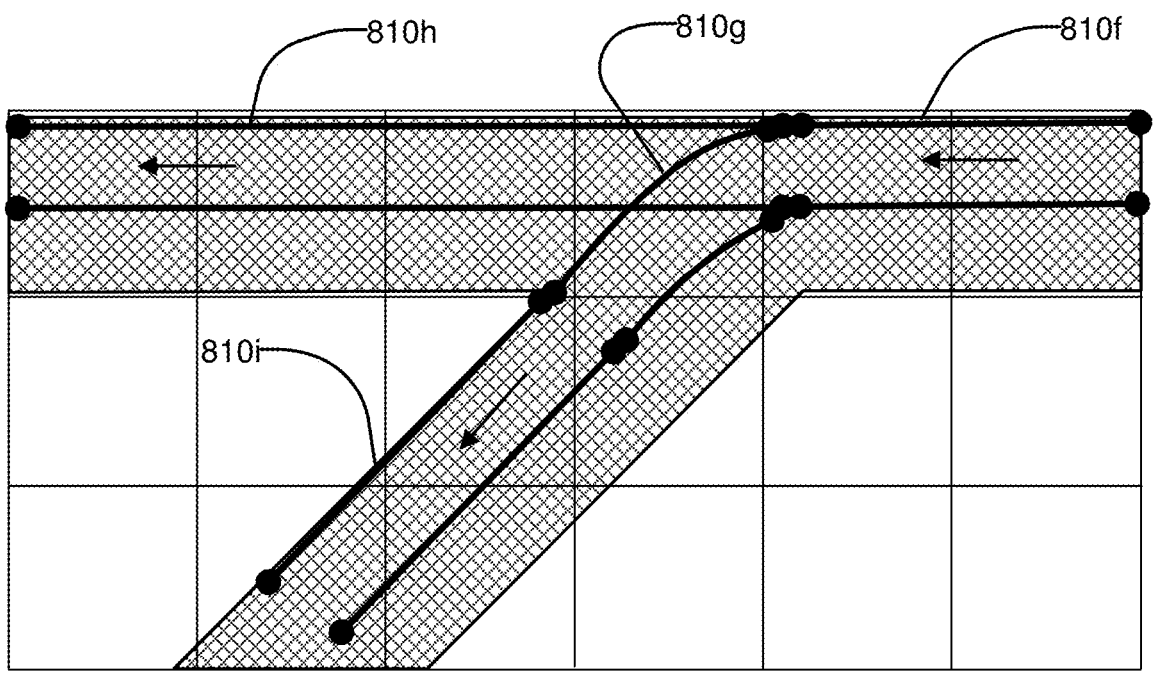

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

System Architecture of Visualization Module

Figure 9:
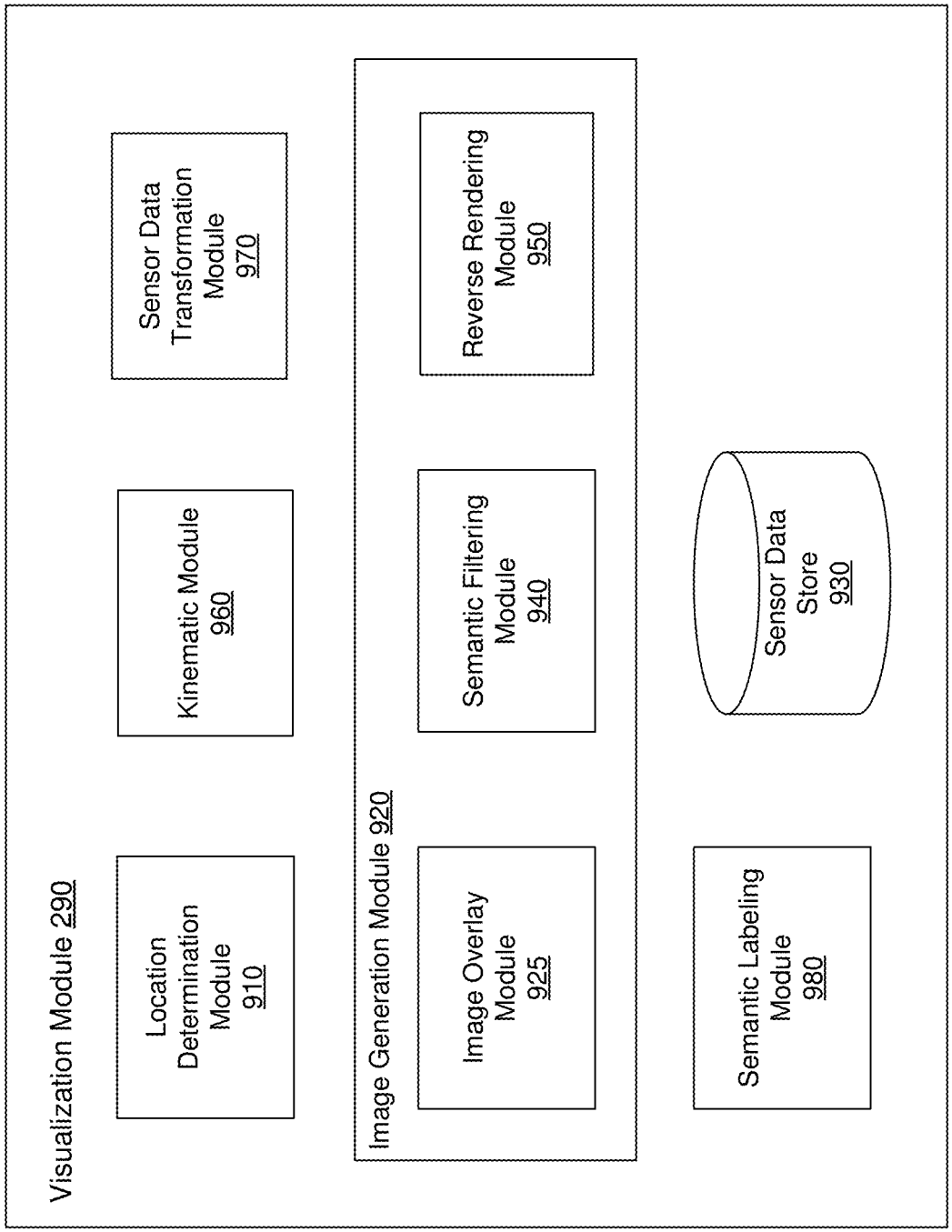
FIG. 9 illustrates the system architecture of the visualization module 290, according to an embodiment.

FIG. 9 illustrates the system architecture of the visualization module 290, according to an embodiment. The visualization module comprises a location determination module 910, an image generation module 920, a sensor data store 930, a sensor data transformation module 970, and a kinematic module 960. In other embodiments, the visualization module 290 may include more or fewer modules than those indicated in FIG. 9. Functionality indicated as being performed by a particular module may be performed by other modules than those indicated herein.

The location determination module 910 determines location of the vehicle. The location determination module 910 performs localization to determine the current pose of the vehicle. The pose of the vehicle comprises a location and an orientation of the vehicle. The location determination module 910 may perform localization using sensor data, for example, by comparing camera images and lidar scans with HD map data to determine the pose of the vehicle. The location determination module 910 may use other techniques for performing localization, for example, by using kinematic equations as processed by the kinematic module 960. For example, the location determination module 910 uses a previous location determined at a previous point in time and uses motion parameters including the velocity and/or acceleration determined by the IMU to determine the current location. In an embodiment, the location determination module 910 determines the current pose of the vehicle based on multiple techniques and combines the results, for example using Kalman filtering techniques to determine an accurate estimate of the vehicle's pose. Techniques for determining pose of the vehicle are described in the patent application Ser. No. 16/208,026 filed on Dec. 3, 2018, hereby incorporated by reference in its entirety. The pose of the vehicle may also be referred to herein as location of the vehicle.

The location determination module 910 invokes the kinematic module 960 to determine the location of the vehicle at a point in time that may be different from the current point in time. For example, the location determination module 910 may receive a timestamp indicating a point of time of capture of sensor data and determines pose of the vehicle at that point in time. The location determination module 910 uses the motion parameters of the vehicle as determined by the kinematic module 960 to determine the pose of the vehicle at any specified point in time.

The sensor data store 930 stores sensor data captured by sensors of the vehicle. The sensor data store 930 stores sensor data along with metadata describing the sensor data. The sensor data may comprise images captured by cameras, lidar scan captured by lidar, and so on. The metadata describes the sensor data and may comprise information identifying the sensor that captured the sensor data and timestamp representing time of capture of the sensor data.

The kinematic module 960 receives a pose P1 of the vehicle at time t1, for example, the current time, and determines a pose P2 of the vehicle at another time t2, for example, the time of capture of particular sensor data. The kinematic module 960 performs computations based on kinematic equations to determine pose of the vehicle at a particular time. In an embodiment, the kinematic module 960 determines velocity parameters describing velocity of the vehicle and determines distances travelled by the vehicle using the velocity parameters. In an embodiment, the kinematic module 960 uses equation (1) for determining position of the vehicle, assuming constant acceleration:

$$p = p_0 + v_0 t + \tfrac{1}{2} a t^2 \quad (1)$$

In equation (1), p represents the current position of the vehicle, a represents acceleration, t represents time, $p_0$ represents the position of the vehicle at a previous time t=0, and $v_0$ represents the velocity of the vehicle at the previous time t=0. In an embodiment, the kinematic module 960 receives timestamps for every column of points in the lidar point cloud, and determines the position of the vehicle corresponding to each timestamp. Alternatively, the kinematic module 960 receives the timestamp representing the time of capture of a camera image and determines the position of the vehicle corresponding to the timestamp.

In an embodiment, the kinematic module 960 determines linear velocity parameters having three components: a component along X-axis, a component along Y-axis, and a component along Z-axis. The kinematic module 960 determines angular velocity having three components: a roll component, a yaw component, and a pitch component. Accordingly, for each time point the kinematic module determines six velocity parameters.

In some embodiments, the kinematic module 960 performs computations based on an assumption of constant acceleration over the duration of the timespan (from $t_0$ to $t_2$). Since the lidar is typically collecting data at a relatively high frequency (for example, 10 Hz), assuming a constant acceleration does not result in significant loss of accuracy during the small time window of interest. This model provides higher accuracy than a simple constant velocity model based model. A constant velocity model based model does not meet the accuracy requirement for building an HD map due to significant changes in the translational and rotational velocities of a moving vehicle when turning, stopping, or accelerating during the course of a single lidar scan. For example, when turning, a vehicle can complete a 90 degree turn within seconds. If the system assumes a linear turning speed, the computations result in large angular errors, which results in large distance error (>10 cm) for laser measurements with high range.

In some embodiments, kinematic module 960 uses a more advanced model, e.g., higher-order parameterization on acceleration. These models have higher complexity and require more parameters. Under the assumption that the translation and angular accelerations are constant in the time intervals $(t_0, t_1)$ and $(t_1, t_2)$, the kinematic module 910 uses following equations 6a, 6b, 6c, and 6d to compute the linear velocity and angular velocity at any arbitrary time t via interpolation.

$$t \in [t_0, t_1], v(t) = \frac{t_1 - t}{t_1 - t_0} v_0 + \frac{t - t_0}{t_1 - t_0} v_1 \quad (6a)$$

$$t \in [t_0, t_1], \omega(t) = \frac{t_1 - t}{t_1 - t_0} \omega_0 + \frac{t - t_0}{t_1 - t_0} \omega_1 \quad (6b)$$

$$t \in [t_1, t_2], v(t) = \frac{t_2 - t}{t_2 - t_1} v_1 + \frac{t - t_1}{t_2 - t_1} v_2 \quad (6c)$$

$$t \in [t_1, t_2], \omega(t) = \frac{t_2 - t}{t_2 - t_1} \omega_1 + \frac{t - t_1}{t_2 - t_0} \omega_2 \quad (6d)$$

The kinematic module 960 uses following equations 7a, 7b, 7c, and 7d obtained by integration of equations 6a, 6b, 6c, and 6d respectively to compute the location (represented as x(t)) and roll, pitch, yaw values (represented as R(t)) at arbitrary timestamp t as follows:

$$t \in [t_0, t_1], x(t) = v_0(t - t_0) + \frac{v_1 - v_0}{2(t_1 - t_0)}(t - t_0)^2 \quad (7a)$$

$$t \in [t_0, t_1], R(t) = \omega_0(t - t_0) + \frac{\omega_1 - \omega_0}{2(t_1 - t_0)}(t - t_0)^2 \quad (7b)$$

$$t \in [t_1, t_2], x(t) = x(t_1) + v_1(t - t_1) + \frac{v_2 - v_1}{2(t_2 - t_1)}(t - t_1)^2 \quad (7c)$$

$$t \in [t_1, t_2], R(t) = R(t_1) + \omega_1(t - t_1) + \frac{\omega_2 - \omega_1}{2(t_2 - t_1)}(t - t_1)^2 \quad (7d)$$

The kinematic module 960 performs the integrated translation and rotation using a 4×4 transformation matrix M(t) represented using equation (8) as follows.

$$M(t) = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma & x_1 \\ \sin\alpha\cos\beta & \sin\alpha\sin\beta\sin\gamma + \cos\alpha\cos\gamma & \sin\alpha\sin\beta\cos\gamma - \cos\alpha\sin\gamma & x_2 \\ -\sin\beta & \cos\beta\sin\gamma & \cos\beta\cos\gamma & x_3 \\ 0 & 0 & 0 & 1 \end{bmatrix} \quad (8)$$

where, $x(t) = [x_1, x_2, x_3]^T$, $R(t) = [\gamma, \beta, \alpha]$, where $\gamma, \beta, \alpha$ is the corresponding roll, pitch, yaw value.

The image generation module 920 generates images for display and sends them for display. The image generation module 920 generates images by combining sensor data with HD map data, for example, camera images combined with a point cloud representation of a region from the HD map. The image generation module 920 may generate images by combining multiple types of sensor data, for example, camera images combined with lidar scans. The image generation module 920 may receive point clouds representing objects that may not exit in the HD map and add them to sensor data, for example, camera images. Accordingly, the image generation module 920 generates images that display virtual objects, for example, virtual billboards that may not exist in real world. The generated images may be displayed via a display device that is in the vehicle or outside the vehicle. For example, image generation module 920 may generate images and transmit them to a client device, for example, a mobile device or a headset of a virtual reality system.

The image generation module comprises an image overlay module 925, a semantic filtering module 940, a reverse rendering module 950. The image overlay module 925 overlays different types of data for generating an image. For example, the image overlay module 925 may overlay HD map data on camera images, for example, by overlaying objects represented in the HD map data using point clouds on camera images. The image overlay module 925 may overlay sensor data received from one sensor on sensor data received from another sensor, for example, by overlaying lidar scans on camera images. The image overlay module 925 may overlay objects that may not exist in the HD map data, for example, virtual objects over sensor data, for example, camera images.

The reverse rendering module 950 generates a bottom up view of an HD map for display based on processes described herein. The semantic filtering module 940 filters objects that satisfy certain criteria from the HD map and generates an image displaying the remaining scene based on processes described herein. The processes executed by these modules are further described herein.

The semantic labeling module 980 creates and stores metadata describing semantic labels for three-dimensional objects in the OMap. The metadata describes real-world objects with the semantic labels. Some examples of semantic labels include labeling trees with semantic labels such as "plants" or "trees." The semantic labeling module 980 determines semantic labels for the objects from the OMap using stored metadata describing objects and matching objects from the OMap with the stored metadata and associated objects. The semantic labeling module 980 stores the semantic labels in relation to the associated objects. In some embodiments, a user specifies some or all of the semantic labels for objects. For example, the user may label their house as "home" or their workplace as "office." In some embodiments semantic labels are received from a plurality of users, for example, via crowdsourcing and collected in a database. In some embodiments, the semantic labeling module 980 determines labels for various objects using machine learning, for example, a neural network. In an embodiment, the semantic labeling module 980 uses a convolutional neural network configured to receive a set of 3D points corresponding to an object and predicts one or more labels for the input object. The neural network is trained to predict a label of a particular type given the HD map representation of an object comprising a set of 3D points representing the object. The results predicted by the neural network are stored in the map data store. The results predicted by a neural network may be verified by a user, for example, an expert.

High Definition Map Based Visualization

Figure 10:
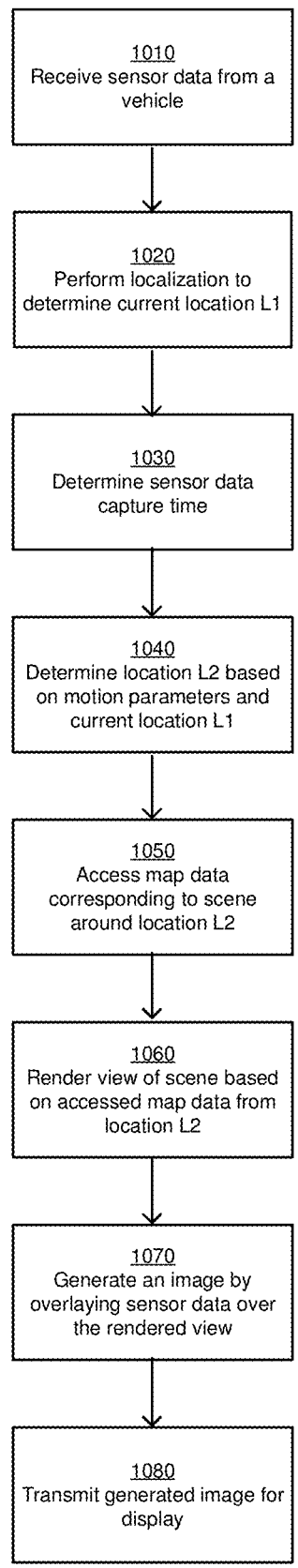
FIG. 10 is a flowchart that illustrates the process for rendering images of map data overlaid on sensor data, according to one embodiment.

FIG. 10 is a flowchart that illustrates the process for rendering images of map data overlaid on sensor data 230, according to one embodiment. The steps illustrated in the flowchart may be performed in an order different from that indicated herein. Furthermore, the steps may be performed by a module different from that indicated herein.

The vehicle computing system 120 of a vehicle 150 receives 1010 sensor data 230 captured by sensors of the vehicle 150. The sensor data 230 represents the surroundings of the vehicle 150 as the vehicle drives 150 along a route. In some embodiments, the sensor data 230 is real-time data captured and processed as the vehicle 150 drives along a route. In other embodiments, the sensor data 230 is stored in sensor data store 930 and processed offline. The vehicle sensors 105 that capture the sensor data 230 are calibrated so that coordinates on the vehicle sensors 105 can be mapped to coordinates in a vehicle-centric or camera-centric coordinate system.

The location determination module 910 of the vehicle computing system 120 performs 1020 localization based on the sensor data 230 to determine a location of the vehicle 150 at a particular time. Localization represents the process of determining a pose of the vehicle 150 with respect to the HD map 510. The localization process is repeated as the vehicle drives along a route. In some embodiments, the localization process is repeated periodically at a predetermined rate, for example, multiple times in a second.

The vehicle computing system 120 determines 1030 a sensor data capture time. The sensor data capture time represents the time of capture of the sensor data 230. For certain sensors, the data is captured during a time interval, for example, by a rolling shutter camera or a lidar. The sensor data capture time for such sensors represents a time associated with the data capture, for example, the time at the end of the interval during which data is captured. In an embodiment, the sensor data capture time is the time reported by the sensor along with the sensor data. The vehicle computing system 120 logs the time as the vehicle captures the sensor data 230. The sensor data 230 is stored in a sensor data store, and the vehicle computing system 120 accesses the sensor data store to determine the time associated with the sensor data 230.

The vehicle computing system 120 determines 1040 a second location. The second location is the location of the vehicle at the sensor data capture time. The second location is determined based on the current location and the motion parameters of the vehicle, or an estimate of motion, between the time of capture of the sensor data and the particular time at which the vehicle was determined to be at the first location. In an embodiment, the vehicle computing system 120 obtains motion parameters from inertial measurement unit of the autonomous vehicle. Examples of motion parameters used by the vehicle computing system 120 include velocity including linear velocity and angular velocity and acceleration including linear acceleration and angular acceleration. In other embodiments, the vehicle has access to more or fewer motion parameters. As an example, if the vehicle is travelling at 10 meters per second at the first location and not accelerating, and the vehicle passed through the second location 3 seconds later, the vehicle will have moved about 30 meters. In an embodiment, the vehicle computing system 120 uses integration techniques to convert acceleration to velocity parameters or velocity parameters to distance parameters. The vehicle computing system 120 uses the computed distance to determine a location relative to another location, for example, a location at sensor data capture time from a predetermined location at current time.

The vehicle computing system 120 accesses 1050 map data corresponding to a scene surrounding the second location of the vehicle. The map data is HD map 510 data, which contains high resolution information that allows the vehicle the capability to accurately navigate the real world and localize itself with respect to the HD map 510. The vehicle computing system 120 uses the map data to render 1060 an image of a scene based on the accessed map data. The scene is the view of surrounding the second location of the vehicle that a user in the vehicle would see at that location. In some embodiments, the scene includes one or more objects (also referred to as features) represented in the HD map, for example, buildings, road signs, traffic lights, sections of the road, and road markings.

The vehicle computing system 120 generates 1070 a combined image by overlaying the sensor data 230 over the rendered image of the scene. The sensor data may include camera images or lidar scans. In an embodiment, the vehicle computing system 120 combines multiple sensor data, for example, camera image as well as lidar scans in an image.

The combined image may show the markings between lanes on the road or the location of the destination of the vehicle. In some embodiments, the vehicle computing system 120 generates the combined image to show objects or features in colors different from the colors of the corresponding objects in the scene.

In some embodiments, the combined image shows the information about traffic or advertisements, such as through adding information to billboards or other signs. In other embodiments, the overlaid sensor data shows statistics about the vehicle, such as average speed, average miles per gallon, and average time spent driving.

The vehicle computing system 120 transmits 1080 the generated image for display on a client device. In some embodiments, the generated image is displayed on a user interface on a client device. In other embodiments, the generated image is displayed within the vehicle on a screen on the dashboard or the windshield. In some embodiments, the user can alter the image to move the view of the surroundings.

In some embodiments, the estimate of motion of the vehicle, for example, an autonomous vehicle is determined based on motion parameters obtained from an inertial measurement unit of the vehicle. In other embodiments, the motion parameters are other motion parameters such as velocity, acceleration, or any combination thereof.

In some embodiments, the sensor data is camera image data captured by a camera mounted on the vehicle. In other embodiments, the sensor data is a column of lidar scan captured by a lidar sensor mounted on the vehicle. The sensor data may be a combination of camera and lidar data, in other embodiments.

In some embodiments, vehicle computing system 120 repeats the steps shown in the flowchart of FIG. 10. The steps are repeated to dynamically update the generated image as the vehicle drives along the route. In some embodiments, there are more steps than are shown in the flowchart of FIG. 10.

In some embodiments, the rendered view displays one or more objects. The one or more objects correspond to one or more objects shown in the sensor data, and the rendered view shows the one or more objects in a color that is distinct from the color of the one of more objects shown in the sensor data. For example, the vehicle computing system 120 may show the edge of curbs in orange or lane lines in blue. An example of this is further shown in FIG. 14.

In some embodiments, the vehicle computing system 120 also determines information describing the scene before rendering a second image of an object that does not exist in the scene. The vehicle computing system 120 then overlays the second image over the generated image. For example, the vehicle computing system 120 may overlay a point indicating a destination of the vehicle over the generated image. An example of this is further shown in FIG. 14.

In some embodiments, the second image comprises information describing the route of the vehicle. The information may comprise signs, markings, messages, or any combination thereof. For example, the second image may show a speed limit sign or a message about an upcoming traffic delay.

In some embodiments, the sensor data represented a lidar scan, which is shown as dots representing points. The vehicle computing system 120 scales the dots by a distance of a point corresponding to a dot relative to the vehicle. The dots representing points closer to the vehicle are larger than the dots representing points farther from the vehicle.

In some embodiments, the vehicle computing system 120 further transmits the generated image to a remote display device for displaying a video. The video shows the scene as observed from the point of view of the vehicle as the vehicle moves.

In some embodiments, the vehicle computing system 120 also compares a rendered view corresponding to an object in the HD map data with a corresponding view of the object in the sensor data. The vehicle computing system 120 then determines an estimate of error in the rendered view of the object and the corresponding view of the object in the sensor data. In response to the estimate of error indicating more than a threshold error, the vehicle computing system 120 performs a corrective action.

In some embodiments, the vehicle computing system 120 performs corrective actions by transmitting an alert message to a device. In other embodiments, the vehicle computing system 120 performs corrective actions by changing a localization technique used for performing localization for the vehicle in the location determination module 910. In other embodiments, the vehicle computing system 120 performs corrective actions by logging a message indicating error in localization.

Figure 11:
FIG. 11 is a screenshot of an image obtained by combining map data with sensor data when the localization result is of poor quality, according to an embodiment.

FIG. 11 is a screenshot of an image obtained by combining map data with sensor data when the localization result is of poor quality, according to an embodiment. The image 1100 is obtained by combining images representing objects in the HD map with sensor data, for example, images captured by cameras of a vehicle. For example, the shapes 1110*a* and 1110*b* represent traffic lights as represented in the HD map data, for example, the OMap data. The image obtained by the camera of the vehicle also shows the corresponding traffic lights 1120*a* and 1120*b*. The localization of the vehicle is performed using techniques that provide low accuracy, for example, using GPS (global positioning system) data. FIG. 11 shows that the representations of each object from the HD map are at least a threshold distance away from the corresponding representations of the object in the camera image. Similarly, the lines 1130 representing road features such as cross walks in the HD map do not overlap the corresponding lines 1140 of the image. Similarly, features such as lane lines 1150 from the HD map do not overlap the representations of the lane lines 1160 in the camera image. Such an image 1100 illustrates that the localization of the vehicle is not very accurate and may lead to accidents if the navigation of an autonomous vehicle was performed using such accuracy of localization.

Figure 12:
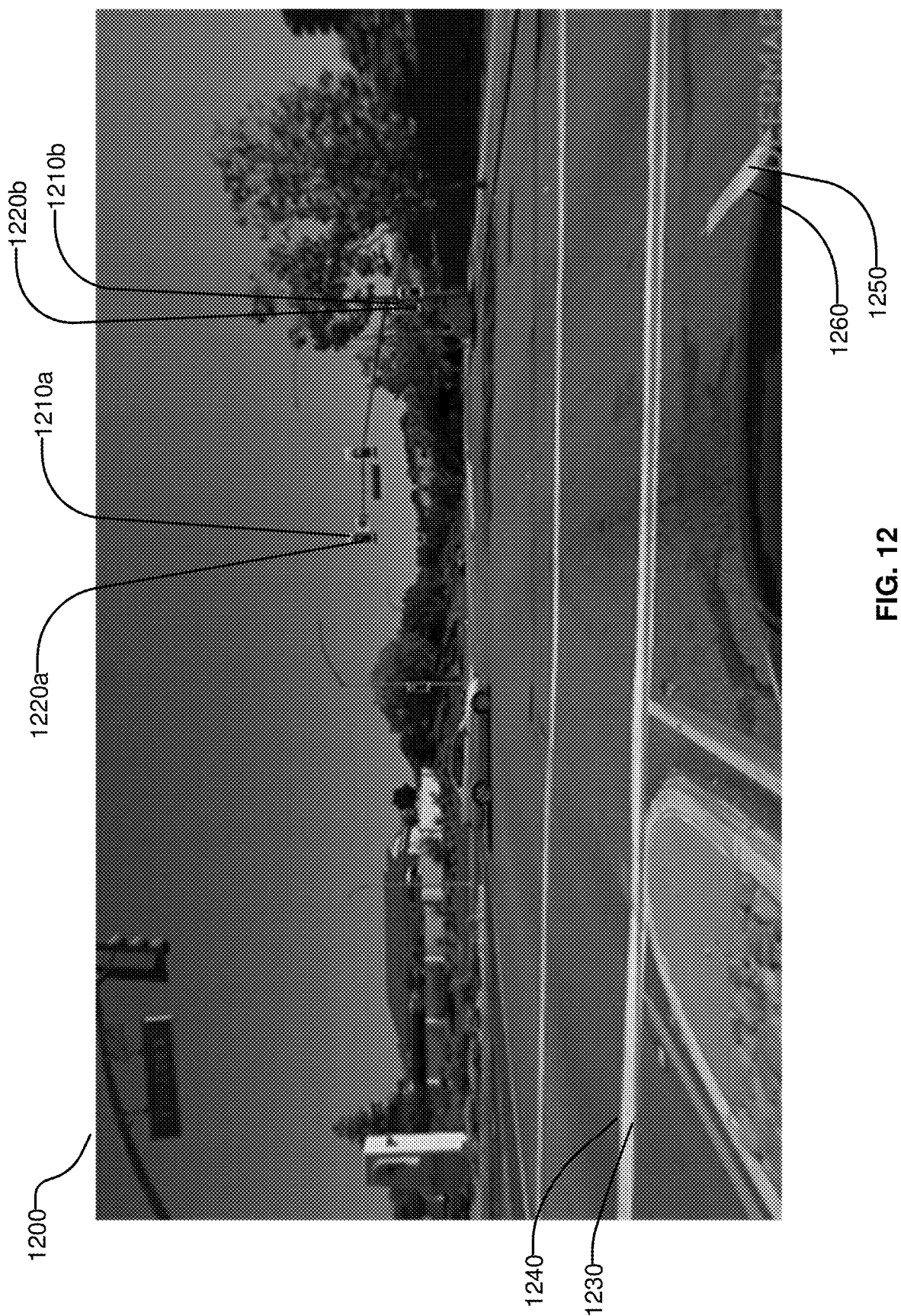
FIG. 12 is a screenshot of an image obtained by combining map data with sensor data when the localization result is of good quality, according to an embodiment.

FIG. 12 is a screenshot of an image obtained by combining map data with sensor data when the localization result is of good quality, according to an embodiment. This image uses localization having high accuracy. Accordingly features or objects of the HD map are within a threshold distance of their corresponding representation in the camera image. As a result, features or objects of the HD map are significantly overlapping their corresponding representation in the camera image. For example, the representations 1210*a*, 1210*b* of traffic lights from HD map significantly overlap the representations 1220*a*, 1220*b* of the traffic lights in the camera image, respectively. Similarly, the lines 1230 representing road features such as cross walks in the HD map significantly overlap the corresponding lines 1240 of the image. Similarly, features such as lane lines 1250 from the HD map significantly overlap the representations of the lane lines 1260 in the camera image. Such an image 1200 illustrates that the localization of the vehicle is accurate and would result in proper navigation of an autonomous vehicle with very small likelihood of errors caused by localization.

Figure 13:
FIG. 13 is a screenshot of an image showing sensor data captured by sensors of a vehicle, according to an embodiment.

FIG. 13 is a screenshot of an image showing sensor data captured by sensors of a vehicle, according to an embodiment. The vehicle computing system can overlap objects from HD map data as well as virtual objects that do not exist in real world on the image 1300.

Figure 14:
FIG. 14 is a screenshot of an image showing sensor data captured by sensors of a vehicle combined with images showing additional information, according to an embodiment.

FIG. 14 is a screenshot of an image showing sensor data captured by sensors of a vehicle combined with images showing additional information, according to an embodiment. The image 1400 shows the data of the camera image 1300 with featured overlaid, for example, features from HD map such as the lane lines 1420 or features 1410 that do not exist in the real world such as a virtual billboard.

Reverse Rendering of an Image Based on High Definition Map Data

Figure 15:
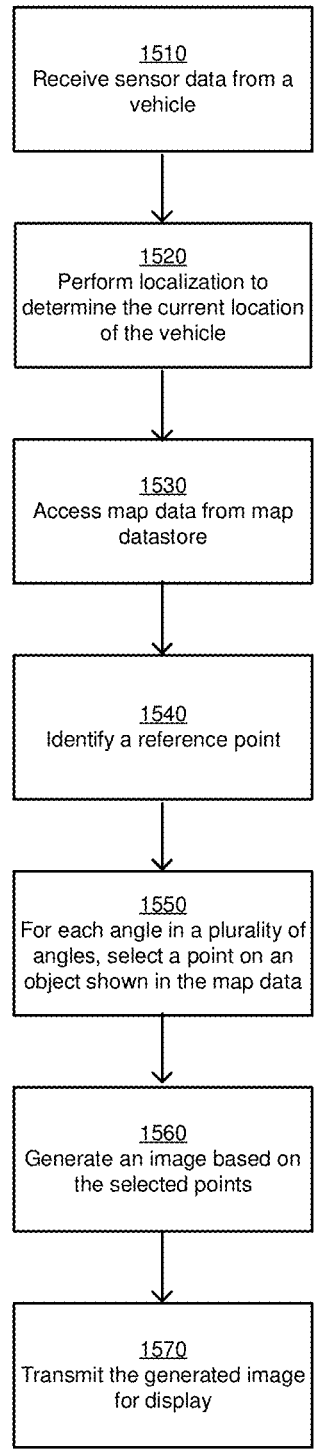
FIG. 15 is a flowchart that illustrates the process for reverse rendering of objects in HD map data, according to an embodiment.

FIG. 15 is a flowchart that illustrates the process for reverse rendering of objects in HD map data, according to an embodiment. The steps illustrated in the flowchart may be performed in an order different from that indicated herein. Furthermore, the steps may be performed by a module different from that indicated herein.

The vehicle computing system 120 receives 1510 sensor data 230 from a vehicle. The sensor data 230 comprises information about a route of the vehicle. In some embodiments, the sensor data 230 is real-time data, meaning the sensor data is being processed as the sensor data is captured while the vehicle is driving along a route. In other embodiments, previously captured sensor data 230 that is stored in a sensor data store 930 is processed offline. The vehicle sensors 105 that capture the sensor data 230 are calibrated so that coordinates on the vehicle sensors 105 can be mapped to coordinates in a vehicle-centric or camera-centric coordinate system.

The vehicle computing system 120 performs 1520 localization based on the sensor data to determine a pose of the vehicle. The localization process is repeated as the vehicle drives along a route. In some embodiments, the localization process is repeated periodically at a predetermined rate, for example, multiple times in a second.

The vehicle computing system 120 accesses 1530 HD map data for a region surrounding the vehicle, for example, OMap 530 data, which is a three-dimensional volumetric grid representation of the static world. The vehicle computing system 120 identifies 1540 a reference point in the map data. The reference point may be selected a point at a height that is at least a threshold above the ground level at the latitude/longitude of the vehicle. The threshold height is greater than height of objects in the scene surrounding the current location of the autonomous vehicle, for example, the trees and buildings so that all these objects can be seen in the view. In another embodiment, the reference point is closer to the ground level, for example, a point located on the vehicle.

The vehicle computing system 120 selects points on objects of the HD map for display in an image. In an embodiment, the vehicle computing system 120 selects a plurality of angles. For each angle in the plurality of angles, the vehicle computing system 120 selects 1550 a point on an object shown in the HD map. The select object is the object that is farthest from the reference point along a line through the map data at the angle. Some of the angles may be associated with one or more additional objects between the reference point and the object. These additional objects would obstruct the view of the selected point on the object from the reference point if an observer viewed the selected point from the reference point since they are in the line of sight of the reference point. However, since the vehicle computing system 120 has the HD map data that describes all the objects in a given geographical region, the vehicle computing system 120 can render the farthest object and excludes the additional objects that obstruct the view of the farthest object from the reference point. As a result, the additional objects obstructing the view of the object are eliminated from the view in the image.

The vehicle computing system 120 generates 1560 an image displaying the selected points. The vehicle computing system 120 transmits 1570 the generated image for display on a client device. In some embodiments, the generated image is displayed on a user interface.

Figure 16:
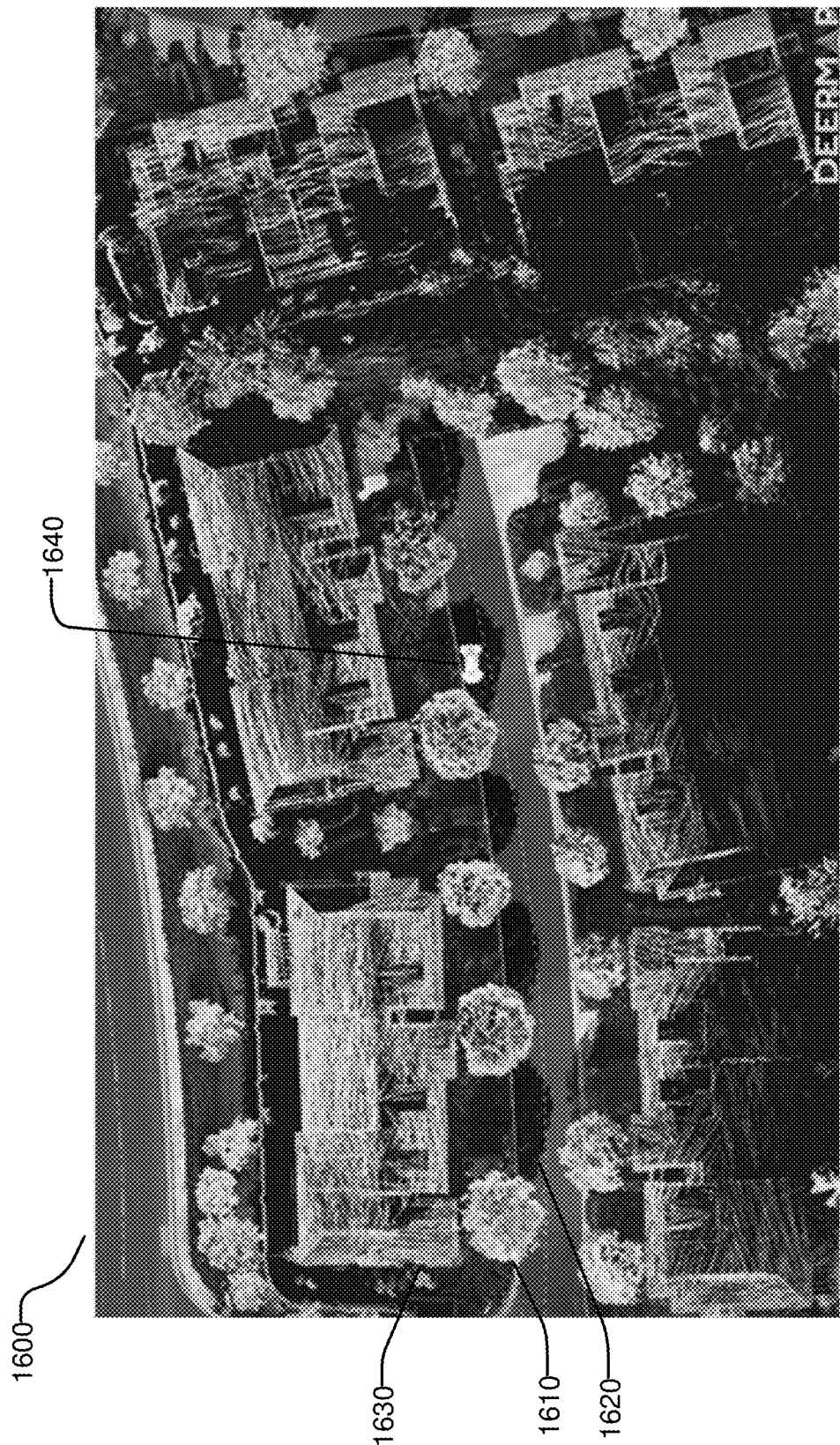
FIG. 16 is a screenshot of an image showing HD map data as viewed from a point above a threshold height, according to an embodiment.
Figure 18:
FIG. 18 is a screenshot of an image showing HD map data as viewed at an angle from a point above a threshold height, according to an embodiment.

FIG. 16 is a screenshot of an image showing HD map data as viewed from a point above a threshold height, according to an embodiment. The image 1600 shown in FIG. 18 is obtained by a normal rendering of the data of the HD map. The scene represents a top down view of the region around the vehicle 1640. The scene shows objects such as trees 1610 and buildings 1630. Some objects such as trees have shadows 1630 which may be partially or fully obstructed by the object itself since the view is from the top.

Figure 17:
FIG. 17 is a screenshot of an image based on reverse rendering of HD map data as viewed from a point above a threshold height, according to an embodiment.

FIG. 17 is a screenshot of an image based on reverse rendering of HD map data as viewed from a point above a threshold height, according to an embodiment. In FIG. 17, the object that is the farthest in the HD map along any given angle is rendered. For example, the street may be the farthest object in the HD map along certain angles. Accordingly, the vehicle computing system renders the street in the image and excludes the trees that obstruct the view of the street. As a result, the shadows 1710 on the street are shown in the image although the trees are not shown. The reverse rendering view allows a viewer to see objects that may be obstructed by other objects.

FIG. 18 is a screenshot of an image showing HD map data as viewed at an angle from a point above a threshold height, according to an embodiment. The image shown in FIG. 18 is obtained by a normal rendering of the data of the HD map. The vehicle 1810 itself is shown in the image. There are objects in the image, for example, trees 1820 that may obstruct other objects such as portions of the street.

Figure 19:
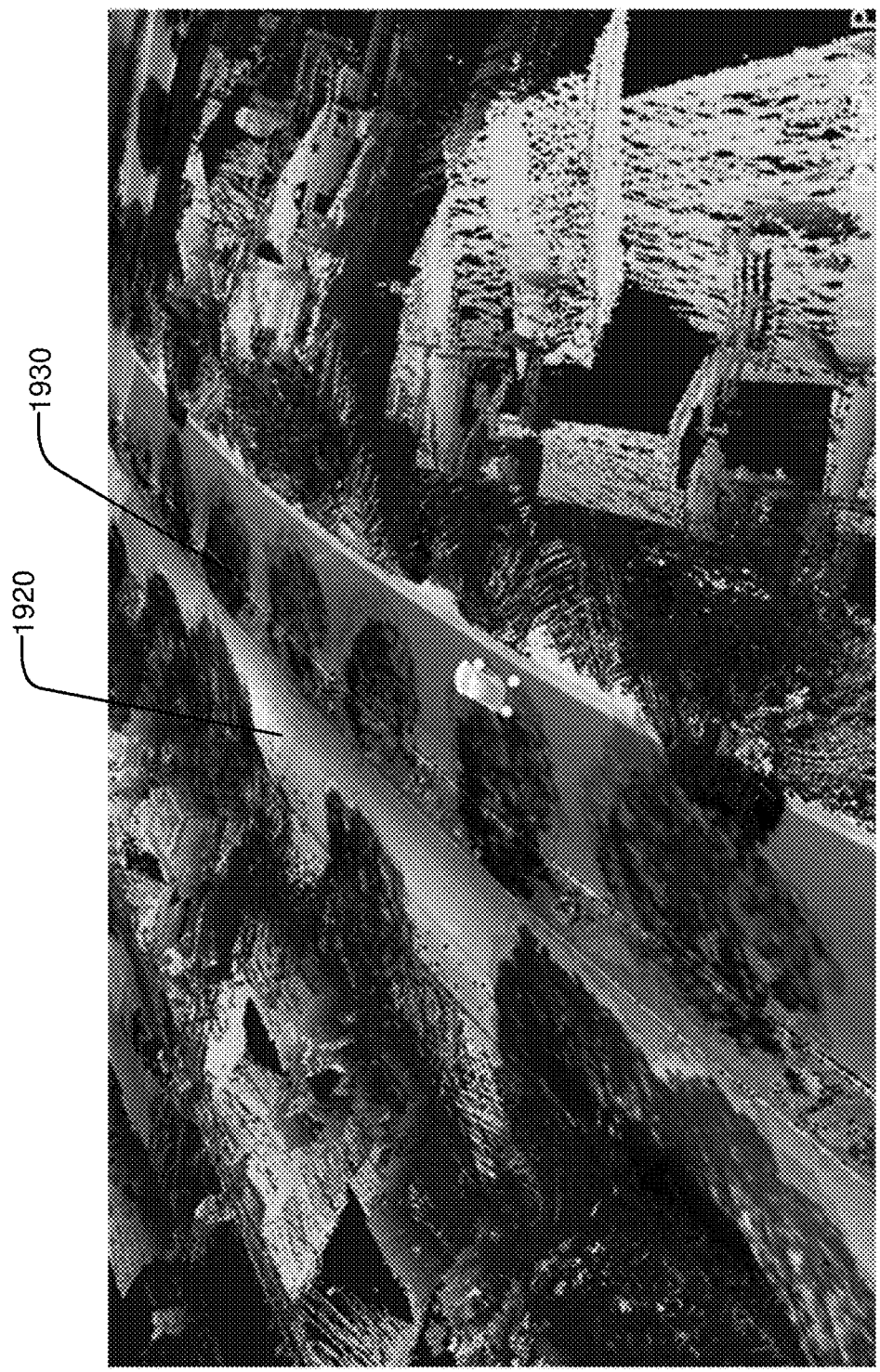
FIG. 19 is a screenshot of an image based on reverse rendering of HD map data as viewed at an angle from a point above a threshold height, according to an embodiment.

FIG. 19 is a screenshot of an image based on reverse rendering of HD map data as viewed at an angle from a point above a threshold height, according to an embodiment. In FIG. 19, the object that is the farthest in the HD map along any given angle is rendered. For example, the street is the farthest object in the HD map along certain angles. Accordingly, the vehicle computing system 120 renders the street 1920 in the image and excludes the trees 1820 that obstruct the view of the street. As a result, the shadows 1930 on the street are shown in the image although the trees 1820 are not shown.

In an embodiment, the reference point moves as the vehicle moves and the generated image is dynamically updated to create visualization of the scene as the vehicle moves.

Accordingly, the vehicle computing system 120 transmits the generated image to a remote display device for displaying a video. The video shows the scene as observed from a moving reference point as the vehicle moves.

Semantic Filtering of 3D Objects in a View Based on High Definition Map Data

Figure 20:
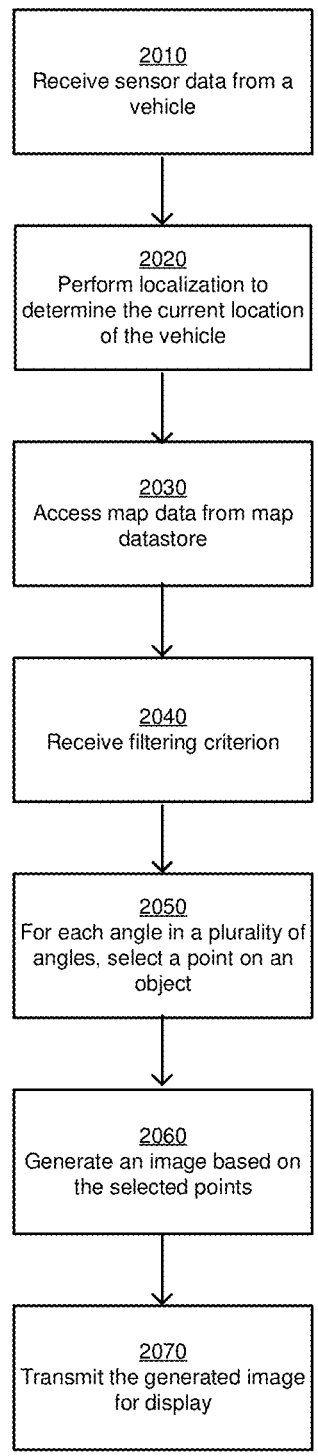
FIG. 20 is a flowchart that illustrates the process for performing semantic label based filtering of objects, according to an embodiment.

FIG. 20 is a flowchart that illustrates the process for performing semantic label based filtering of objects, according to an embodiment. The steps illustrated in the flowchart may be performed in an order different from that indicated herein. Furthermore, the steps may be performed by a module different from that indicated herein.

In this embodiment, a vehicle computing system 120 receives 2010 sensor data 230 from a vehicle. The sensor data 230 represents a scene surrounding the vehicle. In some embodiments, the sensor data 230 is real-time data, meaning the sensor data 230 is being taken as the vehicle computing system 120 requests the sensor data 230. In other embodiments, the sensor data 230 is gathered from a data store.

The vehicle computing system 120 performs 2020 localization based on the sensor data 230 to determine a current location of the vehicle. Localization represents the process of determining a pose of the vehicle 150 with respect to the HD map 510. The localization process is repeated as the vehicle drives along a route. In some embodiments, the localization process is repeated periodically at a predetermined rate, for example, multiple times in a second. In some embodiments, the first location is the current location of the vehicle or it may be a previous location of the vehicle.

The vehicle computing system 120 accesses 2030 map data from a map datastore. The map datastore stores map data from the OMap 530 annotated with metadata describing three-dimensional objects. The metadata describes real-world objects with semantic labels. For example, the map datastore may store trees under the semantic labels "trees" and "plants" or signs under "signs," "road signs," and/or "traffic signs." The vehicle computing system 120 receives 2040 a filtering criterion based on the semantic labels. For example, the filtering criterion may specify the semantic label "trees" to indicate that the vehicle computing system 120 should filter out trees from the generated image. Though trees may be classified under multiple semantic labels, like both "trees" and "plants," by only specifying the label "trees," the vehicle computing system 120 will only filter out objects labeled with "trees." If the vehicle computing system 120 specified "plants," the vehicle computing system 120 may filter out trees and plants other than trees labeled with "plants," such as bushes or shrubs.

For each angle in a plurality of angles originating at a point of origin associated with the vehicle, the vehicle computing system 120 2050 selects a point on an object from the map data. The point is closest to the point of origin along a line through the map data at an angle. The object has a semantic label that fails to match the semantic label specified by the filtering criterion. For example, if filtering criterion specifies the semantic label "trees," objects with labels such as "buildings," "signs," and "signals" would fail to match the filtering criterion and points specifying these semantic labels would be selected. Points on objects labeled with "trees" would not be selected.

The vehicle computing system 120 generates 2060 an image based on the selected points. The image excludes points from objects with semantic labels matching the filtering criterion. As a result, these objects are not shown in the generated image. The vehicle computing system 120 transmits 2070 the generated image for display on a client device. In some embodiments, the generated image is displayed on a user interface.

In other embodiments, the system allows semantic filtering based on any metadata attribute of objects, for example, a height of an object, a size of the object, a color of the object and so on. In an embodiment, the system displays objects via a user interface and receives a selection of a particular object via the user interface for filtering out. Accordingly, the system shows the scene without the selected object.

In an embodiment, the system displays a combination of sensor data, for example, camera image and rendered images of objects from the HD map. For example, the system displays a scene showing a plurality of objects as seen by a camera of a vehicle. However, one or more objects from the camera image may be filtered out based on semantic filtering and replaced by objects from the HD map that are behind the excluded objects in relation the reference point.

In an embodiment, the system identifies an object to be excluded from a scene based on a semantic filter. The system identifies uses the process illustrated in FIG. 10 to identify portions of the identified object in the image. In an embodiment, the system projects the identified object to a 2D plane corresponding to the camera image. The system performs edge detection to identify edges in the image and matches the edges from the image with the corresponding edges of the projection of the identified object from the HD map. The system identifies the object from the image that is closest to the corresponding projection of the identified object from the HD map. The system removes the object from the image and replaces it with projections of 3D objects of the HD map behind the removed object.

Alternative Embodiments

The processes described herein including those shown in FIGS. 10, 15, and 20 determine a geographical region associated with a reference point, for example, a current location of the vehicle and load a portion of the HD map representing the geographical region. In an embodiment, the HD map system uses a fixed threshold distance and identifies a geographical region within the fixed threshold distance of the reference point. In an embodiment, the system varies the threshold distance depending on the vehicle speed. For example, the system uses higher threshold distance values for higher speeds of the vehicle. Accordingly, the threshold distance value is directly proportionate to the speed of the vehicle. This allows the system to visualize objects and features across larger distances that are expected to be reached by a vehicle travelling at higher speeds.

Computing Machine Architecture

Figure 21:
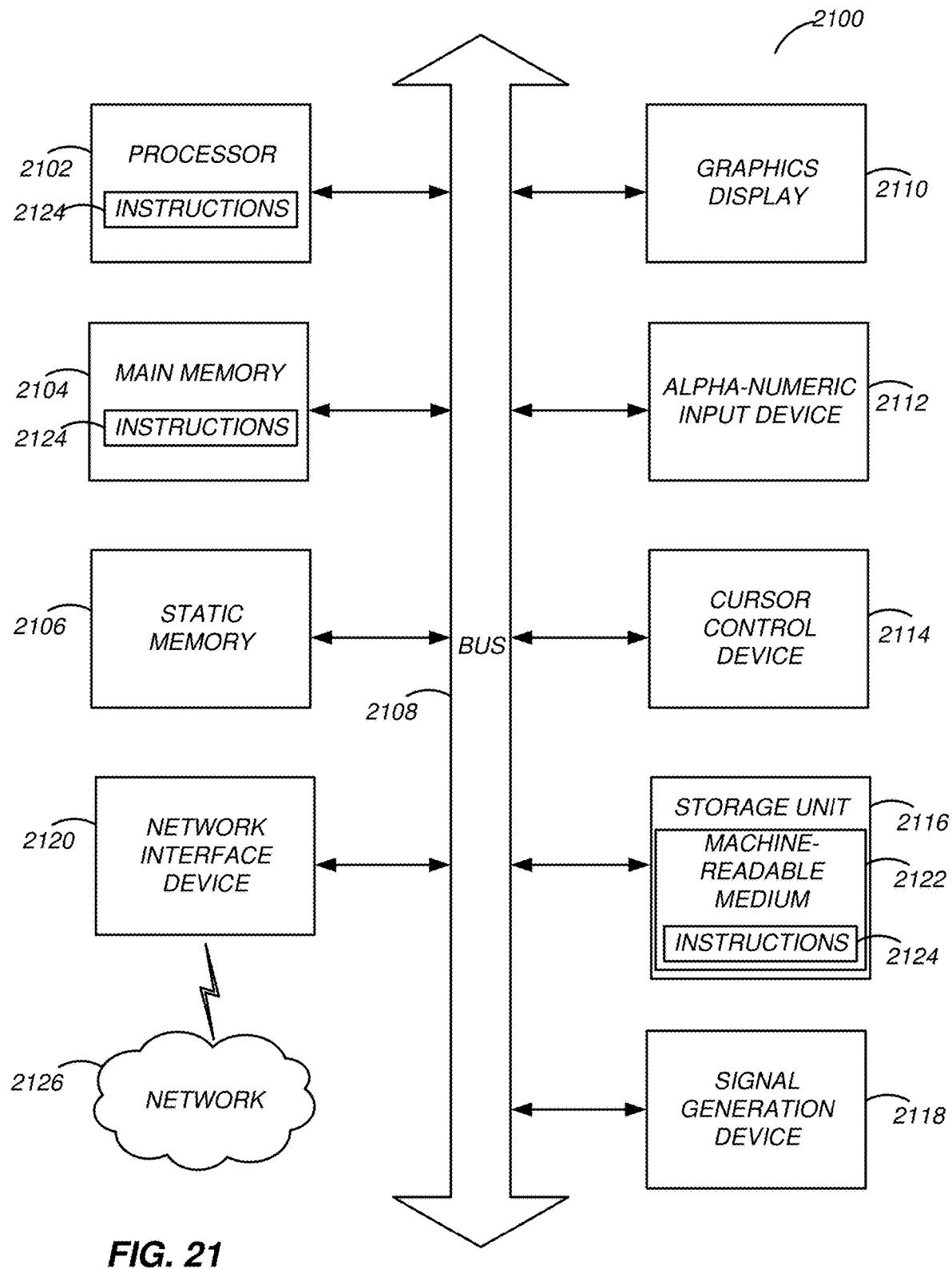
FIG. 21 illustrates an embodiment of a computing machine that can read instructions from a machine-readable medium and execute the instructions in a processor or controller.

FIG. 21 is a block diagram illustrating components of an example machine able to read instructions from a machine-readable medium and execute them in a processor (or controller). Specifically, FIG. 21 shows a diagrammatic representation of a machine in the example form of a computer system 2100 within which instructions 2124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2124 (sequential or otherwise) that specify actions to be taken by that machine. Further, while only a single machine is illustrated, the term "machine" shall also be taken to include any collection of machines that individually or jointly execute instructions 2124 to perform any one or more of the methodologies discussed herein.

The example computer system 2100 includes a processor 2102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 2104, and a static memory 2106, which are configured to communicate with each other via a bus 2108. The computer system 2100 may further include graphics display unit 2110 (e.g., a plasma display panel (PDP), a liquid crystal display (LCD), a projector, or a cathode ray tube (CRT)). The computer system 2100 may also include alphanumeric input device 2112 (e.g., a keyboard), a cursor control device 2114 (e.g., a mouse, a trackball, a joystick, a motion sensor, or other pointing instrument), a storage unit 2116, a signal generation device 2118 (e.g., a speaker), and a network interface device 2120, which also are configured to communicate via the bus 2108.

The storage unit 2116 includes a machine-readable medium 2122 on which is stored instructions 2124 (e.g., software) embodying any one or more of the methodologies or functions described herein. The instructions 2124 (e.g., software) may also reside, completely or at least partially, within the main memory 2104 or within the processor 2102 (e.g., within a processor's cache memory) during execution thereof by the computer system 2100, the main memory 2104 and the processor 2102 also constituting machine-readable media. The instructions 2124 (e.g., software) may be transmitted or received over a network 2126 via the network interface device 2120.

While machine-readable medium 2122 is shown in an example embodiment to be a single medium, the term "machine-readable medium" should be taken to include a single medium or multiple media (e.g., a centralized or distributed database, or associated caches and servers) able to store instructions (e.g., instructions 2124). The term "machine-readable medium" shall also be taken to include any medium that is capable of storing instructions (e.g., instructions 2124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A non-transitory computer readable storage medium storing instructions encoded thereon that, when executed by a processor, cause the processor to perform steps including:
   receiving, by a vehicle, sensor data comprising information about a route of the vehicle;
   performing localization based on the sensor data to determine a location of the vehicle;
   accessing map data corresponding to a region surrounding the determined location of the vehicle;
   identifying a reference point in the map data, the reference point being based on the location of the vehicle;
   for each respective angle of a plurality of angles in the region originating at the reference point and being with respect to a ground plane and a corresponding line passing through the reference point, selecting a corresponding point on a first object from the map data, the corresponding point being located from the reference point along the corresponding line, wherein at least some of the angles are associated with a second object located between the reference point and the first object and wherein the second object at least partially obstructs the first object as viewed from the reference point at one or more of the respective viewing angles;
   generating an image displaying the selected points from the reference point, wherein the generated image shows the first object and excludes the second object based on the second object at least partially obstructing the first object as viewed from the reference point; and transmitting the generated image for display on a client device.

2. The non-transitory computer readable storage medium of claim 1, wherein a height of the reference point is at a threshold height above a ground level that corresponds to the ground plane, the threshold height being greater than a height of objects in the region surrounding the determined location of the vehicle.

3. The non-transitory computer readable storage medium of claim 1, wherein the stored instructions further cause the processor to perform steps comprising:

overlaying an image of the vehicle on the generated image.

4. The non-transitory computer readable storage medium of claim 1, wherein the steps are repeated to dynamically update the generated image as the vehicle drives along the route.

5. The non-transitory computer readable storage medium of claim 1, wherein the generated image shows a perspective view looking down upon the vehicle from the reference point.

6. The non-transitory computer readable storage medium of claim 1, wherein the stored instructions further cause the processor to perform steps comprising:

moving the reference point as the vehicle moves; and transmitting the generated image to a remote display device for displaying a video, the video showing the region as observed from the moving reference point as the vehicle moves.

7. The non-transitory computer readable storage medium of claim 1, wherein the generated image is generated using orthographic projection.

8. The non-transitory computer readable storage medium of claim 1, wherein the steps are repeated for a plurality of locations of the vehicle to produce a plurality of pre-rendered images.

9. A computer-implemented method comprising:

receiving, by a vehicle, sensor data comprising information about a route of the vehicle;

performing localization based on the sensor data to determine a location of the vehicle;

accessing map data corresponding to a region surrounding the determined location of the vehicle;

identifying a reference point in the map data, the reference point being based on the location of the vehicle;

for each respective angle of a plurality of angles in the region originating at the reference point and being with respect to a ground plane and a corresponding line passing through the reference point, selecting a corresponding point on a first object from the map data, the corresponding point being located from the reference point along the corresponding line, wherein at least some of the angles are associated with a second object located between the reference point and the first object and wherein the second object at least partially obstructs the first object as viewed from the reference point at one or more of the respective viewing angles;

generating an image displaying the selected points from the reference point, wherein the generated image shows the first object and excludes the second object based on the second object at least partially obstructing the first object as viewed from the reference point; and transmitting the generated image for display on a client device.

10. The computer-implemented method of claim 9, wherein a height of the reference point is at a threshold height above a ground level that corresponds to the ground plane, the threshold height being greater than a height of objects in the region surrounding the determined location of the vehicle.

11. The computer-implemented method of claim 9, further comprising:

overlaying an image of the vehicle on the generated image.

12. The computer-implemented method of claim 9, wherein the steps are repeated to dynamically update the generated image as the vehicle drives along the route.

13. The computer-implemented method of claim 9, wherein the generated image shows a perspective view looking down upon the vehicle from the reference point.

14. The computer-implemented method of claim 9, further comprising:

moving the reference point as the vehicle moves; and transmitting the generated image to a remote display device for displaying a video, the video showing the region as observed from the moving reference point as the vehicle moves.

15. The computer-implemented method of claim 9, wherein the generated image is generated using orthographic projection.

16. The computer-implemented method of claim 9, wherein the steps are repeated for a plurality of locations of the vehicle to produce a plurality of pre-rendered images.

17. A computer system comprising:

one or more processors; and one or more non-transitory computer readable storage media storing instructions encoded thereon that, when executed by the one or more processors a, cause the system to perform steps comprising:

receiving by a vehicle, sensor data comprising information about a route of the vehicle;

performing localization based on the sensor data to determine a location of the vehicle;

accessing map data corresponding to a region surrounding the determined location of the vehicle;

identifying a reference point in the map data, the reference point being based on the location of the vehicle;

for each respective angle of a plurality of angles in the region originating at the reference point and being with respect to a ground plane and a corresponding line passing through the reference point, selecting a corresponding point on a first object from the map data, the corresponding point being located from the reference point along the corresponding line, wherein at least some of the angles are associated with a second object located between the reference point and the first object and wherein the second object at least partially obstructs the first object as viewed from the reference point at one or more of the respective viewing angles;

generating an image displaying the selected points from the reference point, wherein the generated image shows the first object and excludes the second object based on the second object at least partially obstructing the first object as viewed from the reference point; and transmitting the generated image for display on a client device.

18. The computer system of claim 17, wherein a height of the reference point is at a threshold height above a ground level that corresponds to the ground plane, the threshold height being greater than a height of objects in the region surrounding the determined location of the vehicle.

19. The computer system of claim 17, wherein the stored instructions further cause the system to perform steps comprising:
   overlaying an image of the vehicle on the generated image.

20. The computer system of claim 17, wherein the steps are repeated to dynamically update the generated image as the vehicle drives along the route.

21. The computer system of claim 17, wherein the generated image shows a perspective view looking down upon the vehicle from the reference point.

22. The computer system of claim 17, wherein the stored instructions further cause the system to perform steps comprising:
   moving the reference point as the vehicle moves; and
   transmitting the generated image to a remote display device for displaying a video, the video showing the region scene as observed from the moving reference point as the vehicle moves.

23. The computer system of claim 17, wherein the generated image is generated using orthographic projection.

24. The computer system of claim 17, wherein the steps are repeated for a plurality of locations of the vehicle to produce a plurality of pre-rendered images.

25. The non-transitory computer readable storage medium of claim 1, wherein the reference point is located at a height above the ground plane.

\* \* \* \* \*